United States Patent
Meng et al.

(10) Patent No.: US 11,344,884 B2
(45) Date of Patent: May 31, 2022

(54) MICROFLUIDIC APPARATUS, METHOD OF DETECTING SUBSTANCE IN MICROFLUIDIC APPARATUS, AND SPECTROMETER

(71) Applicant: BOE Technology Group Co., Ltd., Beijing (CN)

(72) Inventors: Xianqin Meng, Beijing (CN); Xiandong Meng, Beijing (CN); Fangzhou Wang, Beijing (CN); Wei Wang, Beijing (CN); Jifeng Tan, Beijing (CN); Jian Gao, Beijing (CN); Xiaochuan Chen, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 279 days.

(21) Appl. No.: 16/617,696

(22) PCT Filed: May 5, 2019

(86) PCT No.: PCT/CN2019/085526
§ 371 (c)(1),
(2) Date: Nov. 27, 2019

(87) PCT Pub. No.: WO2020/019809
PCT Pub. Date: Jan. 30, 2020

(65) Prior Publication Data
US 2021/0354129 A1    Nov. 18, 2021

(30) Foreign Application Priority Data

Jul. 26, 2018 (CN) .......................... 201810836353.3
Jul. 26, 2018 (CN) .......................... 201810837019.X
(Continued)

(51) Int. Cl.
*B01L 3/00* (2006.01)
*G01N 21/64* (2006.01)
(Continued)

(52) U.S. Cl.
CPC ....... *B01L 3/502715* (2013.01); *B01L 3/5023* (2013.01); *B01L 3/5027* (2013.01);
(Continued)

(58) Field of Classification Search
None
See application file for complete search history.

(56) References Cited

U.S. PATENT DOCUMENTS 6,940,593 B2   9/2005  Farr
7,186,567 B1*  3/2007  Sutherland ........... G01N 21/774
                                              252/299.01
(Continued)

FOREIGN PATENT DOCUMENTS

CN    101263372 A    9/2008
CN    101636645 A    1/2010
(Continued)

OTHER PUBLICATIONS

First Office Action in the Chinese Patent Application No. 201810837019.X, dated Mar. 2, 2020; English translation attached.
(Continued)

*Primary Examiner* — Neil N Turk
(74) *Attorney, Agent, or Firm* — Intellectual Valley Law, P.C.

(57) ABSTRACT

A microfluidic apparatus is provided. The microfluidic apparatus includes a first substrate; a microfluidic layer on the first substrate and defining a microfluidic channel, wherein the first substrate having a first side closer to the microfluidic layer, and a second side away from the microfluidic layer, the first side and the second side opposite each other; a
(Continued)

plurality of detectors on a side of the microfluidic channel away from the first substrate; a unitary grating plate on the second side of the first substrate and including a plurality of grating blocks of different wavelength selectivity; and a light extraction layer including a plurality of light extractors on the first side of the first substrate and configured to extract light diffracted by the plurality of grating blocks out of the first substrate.

11 Claims, 8 Drawing Sheets

(30) Foreign Application Priority Data

Jul. 27, 2018 (CN) .......................... 201810844548.2
Aug. 15, 2018 (CN) .......................... 201810930403.4

(51) Int. Cl.
*G02B 6/34* (2006.01)
*G01N 21/63* (2006.01)
*G01N 21/05* (2006.01)
*G01N 21/03* (2006.01)

(52) U.S. Cl.
CPC ........ *B01L 3/502707* (2013.01); *G01N 21/05* (2013.01); *G01N 21/63* (2013.01); *G01N 21/645* (2013.01); *G01N 21/6454* (2013.01); *G02B 6/34* (2013.01); *B01L 2200/025* (2013.01); *B01L 2300/0627* (2013.01); *B01L 2300/0877* (2013.01); *G01N 2021/0346* (2013.01); *G01N 2021/052* (2013.01); *G01N 2201/0633* (2013.01); *G01N 2201/0635* (2013.01)

(56) References Cited

U.S. PATENT DOCUMENTS

| | | | |
|---|---|---|---|
| 9,703,042 | B2 | 7/2017 | Mossberg et al. |
| 2004/0174536 | A1 | 9/2004 | Bonis |
| 2004/0263860 | A1 | 12/2004 | Johnson |
| 2010/0020311 | A1 | 1/2010 | Kirby et al. |
| 2010/0303119 | A1* | 12/2010 | Mayers .................. H01S 3/05 372/53 |
| 2011/0205538 | A1 | 8/2011 | Shibayama et al. |
| 2011/0242670 | A1 | 10/2011 | Simmonds |
| 2013/0038874 | A1 | 2/2013 | Shibayama et al. |
| 2014/0253923 | A1 | 9/2014 | Shibayama et al. |
| 2015/0010271 | A1 | 1/2015 | Beausoleil et al. |
| 2015/0132003 | A1 | 5/2015 | Greiner et al. |
| 2016/0116409 | A1 | 4/2016 | Massetti et al. |
| 2017/0052384 | A1 | 2/2017 | Santori et al. |
| 2017/0227464 | A1 | 8/2017 | Astier et al. |
| 2018/0188152 | A1 | 7/2018 | Vercruysse |
| 2019/0033507 | A1 | 1/2019 | Wang et al. |
| 2020/0108387 | A1 | 4/2020 | Dong et al. |

FOREIGN PATENT DOCUMENTS

| | | |
|---|---|---|
| CN | 102073103 A | 5/2011 |
| CN | 102507448 A | 6/2012 |
| CN | 102822647 A | 12/2012 |
| CN | 102954938 A | 3/2013 |
| CN | 103842783 A | 6/2014 |
| CN | 103999303 A | 8/2014 |
| CN | 104498582 A | 4/2015 |
| CN | 105548096 A | 5/2016 |
| CN | 106471415 A | 3/2017 |
| CN | 107607475 A | 1/2018 |
| CN | 107850537 A | 3/2018 |
| CN | 207276626 U | 4/2018 |
| CN | 108120755 A | 6/2018 |
| CN | 108204965 A | 6/2018 |
| CN | 108255028 A | 7/2018 |
| EP | 1510838 A1 | 3/2005 |
| JP | 2002310796 A | 10/2002 |
| WO | 2011110084 A1 | 9/2011 |

OTHER PUBLICATIONS

First Office Action in the Chinese Patent Application No. 201810930403. 4, dated Jul. 1, 2020; English translation attached.
Decision of Rejection in the Chinese Patent Application No. 201810836353.3, dated Jul. 29, 2020; English translation attached.
International Search Report & Written Opinion dated Aug. 8, 2019, regarding PCT/CN2019/085526.
First Office Action in the Chinese Patent Application No. 201810844548. 2, dated Apr. 23, 2020; English translation attached.
First Office Action in the Chinese Patent Application No. 201810836353. 3, dated Nov. 4, 2019; English translation attached.
Second Office Action in the Chinese Patent Application No. 201810836353.3, dated Apr. 8, 2020; English translation attached.
Third Office Action in the Chinese Patent Application No. 201810836353.3, dated Apr. 15, 2022; English translation attached.
Letter of Decision after Reexamination in the Chinese Patent Application No. 201810836353.3, dated Feb. 9, 2022; English translation attached.

* cited by examiner

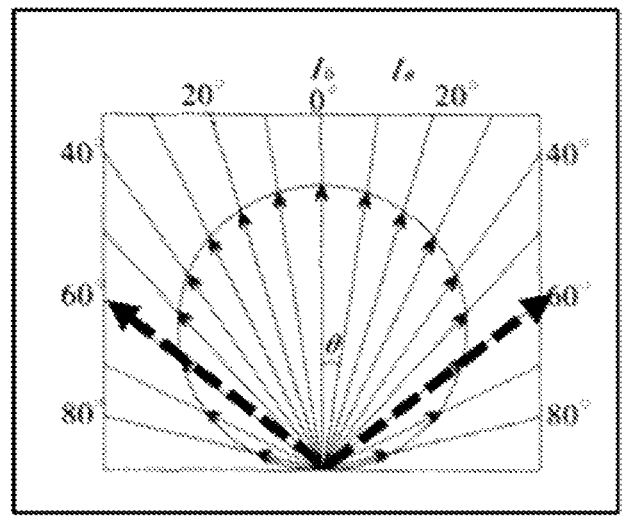
FIG. 3A
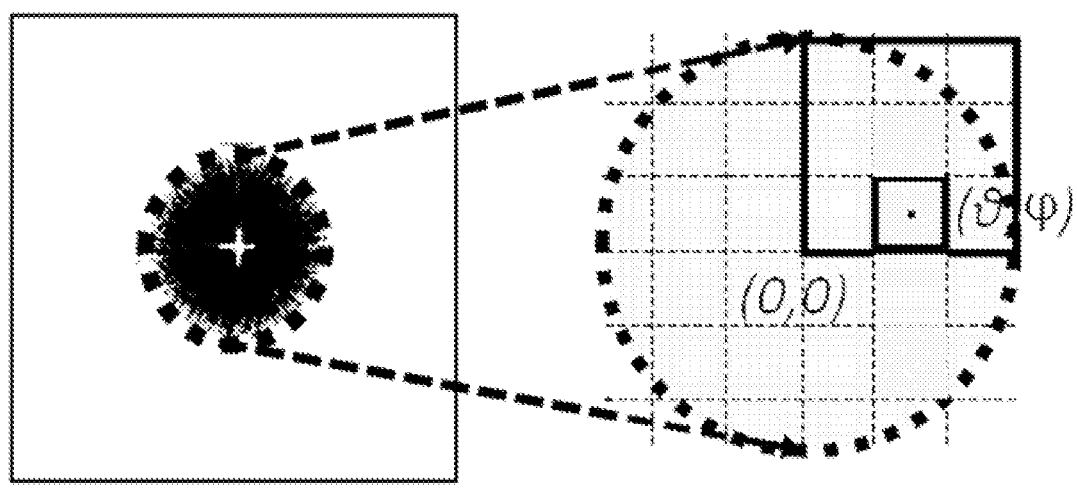
FIG. 3B                    FIG. 3C

MICROFLUIDIC APPARATUS, METHOD OF DETECTING SUBSTANCE IN MICROFLUIDIC APPARATUS, AND SPECTROMETER

CROSS-REFERENCE TO RELATED APPLICATION

This application is a national stage application under 35 U.S.C. § 371 of International Application No. PCT/CN2019/085526, filed May 5, 2019, which claims priority to Chinese Patent Application No. 201810836353.3, filed Jul. 26, 2018, Chinese Patent Application No. 201810837019.X, filed Jul. 26, 2018, Chinese Patent Application No. 201810844548.2, filed Jul. 27, 2018, and Chinese Patent Application No. 201810930403.4, filed Aug. 15, 2018, the contents of which are incorporated by reference in the entirety.

TECHNICAL FIELD

The present invention relates to optical technology and microfluidic technology, more particularly, to a microfluidic apparatus, a method of detecting a substance in a microfluidic apparatus, and a spectrometer.

BACKGROUND

In present, microfluidic apparatus are widely used in physical, biological, and chemical fields for material analysis, molecular diagnostics, food quarantine, and bacterial classification.

SUMMARY

In one aspect, the present invention provides a microfluidic apparatus, comprising a first substrate; a microfluidic layer on the first substrate and defining a microfluidic channel, wherein the first substrate having a first side closer to the microfluidic layer, and a second side away from the microfluidic layer, the first side and the second side opposite each other; a plurality of detectors on a side of the microfluidic channel away from the first substrate; a unitary grating plate on the second side of the first substrate and comprising a plurality of grating blocks of different wavelength selectivity; and a light extraction layer comprising a plurality of light extractors on the first side of the first substrate and configured to extract light diffracted by the plurality of grating blocks out of the first substrate; wherein a respective one of the plurality of light extractors is optically coupled to grating blocks of a same wavelength selectivity of the plurality of grating blocks, and configured to extract light of a same color diffracted by the grating blocks of the same wavelength selectivity into extracted light of a same color; grating blocks of different wavelength selectivity are configured to respectively diffract light of different colors into different light extractors of the plurality of light extractors; a respective one of the plurality of detectors is configured to detect the extracted light of a same color transmitted through the microfluidic channel; and different detectors of the plurality of detectors are configured to respectively detect extracted light of different colors respectively from different light extractors of the plurality of light extractors.

Optionally, the plurality of detectors comprise a first detector and a second detector; the plurality of grating blocks of different wavelength selectivity comprise a plurality of first grating blocks of a first wavelength selectivity and a plurality of second grating blocks of a second wavelength selectivity; and the plurality of light extractors comprise a first light extractor and a second light extractor; wherein the first light extractor is optically coupled to the plurality of first grating blocks of the first wavelength selectivity, and configured to extract light of a first color diffracted by the plurality of first grating blocks of the first wavelength selectivity into extracted light of the first color; the second light extractor is optically coupled to the plurality of second grating blocks of the second wavelength selectivity, and configured to extract light of a second color diffracted by the plurality of second grating blocks of the second wavelength selectivity into extracted light of the second color; the first detector is configured to detect at least portion of the extracted light of the first color transmitted through the microfluidic channel; and the second detector is configured to detect at least portion of the extracted light of the second color transmitted through the microfluidic channel.

Optionally, the plurality of detectors comprise a first detector, a second detector, and a third detector; the plurality of grating blocks of different wavelength selectivity comprise a plurality of first grating blocks of a first wavelength selectivity, a plurality of second grating blocks of a second wavelength selectivity, and a plurality of third grating blocks of a third wavelength selectivity; and the plurality of light extractors comprise a first light extractor, a second light extractor, and a third light extractor; wherein the first light extractor is optically coupled to the plurality of first grating blocks of the first wavelength selectivity, and configured to extract light of a first color diffracted by the plurality of first grating blocks of the first wavelength selectivity into extracted light of the first color; the second light extractor is optically coupled to the plurality of second grating blocks of the second wavelength selectivity, and configured to extract light of a second color diffracted by the plurality of second grating blocks of the second wavelength selectivity into extracted light of the second color; the third light extractor is optically coupled to the plurality of third grating blocks of the third wavelength selectivity, and configured to extract light of a third color diffracted by the plurality of third grating blocks of the third wavelength selectivity into extracted light of the third color; the first detector is configured to detect at least portion of the extracted light of the first color transmitted through the microfluidic channel; the second detector is configured to detect at least portion of the extracted light of the second color transmitted through the microfluidic channel; and the third detector is configured to detect at least portion of the extracted light of the third color transmitted through the microfluidic channel.

Optionally, the respective one of the plurality of light extractors is configured to collimate light of a same color diffracted by the grating blocks of the same wavelength selectivity into substantially collimated light of a same color; the respective one of the plurality of detectors is configured to detect the substantially collimated light of a same color transmitted through the microfluidic channel; and different detectors of the plurality of detectors are configured to respectively detect substantially collimated light of different colors respectively from different light extractors of the plurality of light extractors.

Optionally, the respective one of the plurality of light extractors is configured to converge light of a same color diffracted by the grating blocks of the same wavelength selectivity into focused light converging on a converging point; the respective one of the plurality of detectors is configured to detect the focused light of a same color transmitted through the microfluidic channel, the converging point being on the respective one of the plurality of detectors; and different detectors of the plurality of detectors are configured to respectively detect focused light of different colors respectively from different light extractors of the plurality of light extractors.

Optionally, the microfluidic apparatus further comprises a light source on the first side of the first substrate; wherein the unitary grating plate is configured to diffract light emitted from the light source transmitted through the first substrate; and the light source comprises a light emitting element and a light converging element configured to converge light emitted from the light emitting element into a converged light having a divergence angle between an outmost light beam of the converged light and a normal direction to the first surface, the divergence angle being equal to or less than 30°.

Optionally, the light converging element comprises a converging reflective mirror having a reflective surface on a side of the light emitting element away from the unitary grating plate, and configured to reflect light from the light emitting element to form the converged light.

Optionally, the light converging element comprises a converging lens.

Optionally, a respective one of the plurality of grating blocks is a volume Bragg grating.

Optionally, at least two grating blocks of a same wavelength selectivity are directly adjacent to each other, and form a grating group of the same wavelength selectivity for diffracting light of a same color.

Optionally, the plurality of grating blocks are directly adjacent to each other.

In another aspect, the present invention provides a method of detecting a substance in a microfluidic apparatus, comprising providing a light source on a first side of a first substrate; providing a unitary grating plate on a second side of the first substrate, wherein the unitary grating plate comprises a plurality of grating blocks of different wavelength selectivity, and the unitary grating plate is configured to diffract light emitted from the light source transmitted through the first substrate, the first side and the second side are opposite to each other; providing a light extraction layer comprising a plurality of light extractors on the first side of the first substrate; respectively diffracting light of different colors into different light extractors of the plurality of light extractors using grating blocks of different wavelength selectivity; extracting light of a same color diffracted by grating blocks of a same wavelength selectivity into extracted light of a same color using a respective one of the plurality of light extractors; providing a microfluidic layer on the first substrate and defining a microfluidic channel on a side of the first side away from the second side; providing a plurality of detectors on a side of the microfluidic channel away from the first substrate; detecting the extracted light of a same color transmitted through the microfluidic channel using a respective one of the plurality of detectors; respectively detecting extracted light of different colors respectively from different light extractors of the plurality of light extractors using different detectors of the plurality of detectors.

Optionally, the plurality of detectors comprise a first detector and a second detector; the plurality of grating blocks of different wavelength selectivity comprise a plurality of first grating blocks of a first wavelength selectivity and a plurality of second grating blocks of a second wavelength selectivity; and the plurality of light extractors comprise a first light extractor and a second light extractor; the method further comprises extracting light of a first color diffracted by the plurality of first grating blocks of the first wavelength selectivity into extracted light of the first color using the first light extractor; extracting light of a second color diffracted by the plurality of second grating blocks of the second wavelength selectivity into extracted light of the second color using the second light extractor; detecting at least portion of the extracted light of the first color transmitted through the microfluidic channel using the first detector; and detecting at least portion of the extracted light of the second color transmitted through the microfluidic channel using the second detector.

Optionally, the plurality of detectors comprise a first detector, a second detector, and a third detector; the plurality of grating blocks of different wavelength selectivity comprise a plurality of first grating blocks of a first wavelength selectivity, a plurality of second grating blocks of a second wavelength selectivity, and a plurality of third grating blocks of a third wavelength selectivity; and the plurality of light extractors comprise a first light extractor, a second light extractor, and a third light extractor; the method further comprises extracting light of a first color diffracted by the plurality of first grating blocks of the first wavelength selectivity into extracted light of the first color using the first light extractor; extracting light of a second color diffracted by the plurality of second grating blocks of the second wavelength selectivity into extracted light of the second color using the second light extractor; extracting light of a third color diffracted by the plurality of third grating blocks of the third wavelength selectivity into extracted light of the third color using the third light extractor; detecting at least portion of the extracted light of the first color transmitted through the microfluidic channel using the first detector; detecting at least portion of the extracted light of the second color transmitted through the microfluidic channel using the second detector; and detecting at least portion of the extracted light of the third color transmitted through the microfluidic channel using the third detector.

Optionally, the light source comprises a light emitting element and a light converging element; the method further comprises converging light emitted from the light emitting element into a converged light having a divergence angle between an outmost light beam of the converged light and a normal direction to the first surface, the divergence angle being equal to or less than 30°.

In another aspect, the present invention provides a spectrometer, comprising a first substrate; a light source on a first side of the first substrate; a unitary grating plate on a second side of the first substrate and comprising a plurality of grating blocks of different wavelength selectivity; wherein the unitary grating plate is configured to diffract light emitted from the light source transmitted through the first substrate; and a light extraction layer comprising a plurality of light extractors on the first side of the first substrate and configured to extract light diffracted by the plurality of grating blocks out of the first substrate; wherein a respective one of the plurality of light extractors is optically coupled to grating blocks of a same wavelength selectivity of the plurality of grating blocks, and configured to extract light of a same color diffracted by the grating blocks of the same wavelength selectivity into extracted light of a same color; grating blocks of different wavelength selectivity are configured to respectively diffract light of different colors into different light extractors of the plurality of light extractors.

Optionally, the plurality of grating blocks of different wavelength selectivity comprise a plurality of first grating blocks of a first wavelength selectivity and a plurality of second grating blocks of a second wavelength selectivity; and the plurality of light extractors comprise a first light extractor and a second light extractor; wherein the first light extractor is optically coupled to the plurality of first grating blocks of the first wavelength selectivity, and configured to extract light of a first color diffracted by the plurality of first grating blocks of the first wavelength selectivity into extracted light of the first color; the second light extractor is optically coupled to the plurality of second grating blocks of the second wavelength selectivity, and configured to extract light of a second color diffracted by the plurality of second grating blocks of the second wavelength selectivity into extracted light of the second color.

Optionally, the plurality of grating blocks of different wavelength selectivity comprise a plurality of first grating blocks of a first wavelength selectivity, a plurality of second grating blocks of a second wavelength selectivity, and a plurality of third grating blocks of a third wavelength selectivity; and the plurality of light extractors comprise a first light extractor, a second light extractor, and a third light extractor; wherein the first light extractor is optically coupled to the plurality of first grating blocks of the first wavelength selectivity, and configured to extract light of a first color diffracted by the plurality of first grating blocks of the first wavelength selectivity into extracted light of the first color; the second light extractor is optically coupled to the plurality of second grating blocks of the second wavelength selectivity, and configured to extract light of a second color diffracted by the plurality of second grating blocks of the second wavelength selectivity into extracted light of the second color; and the third light extractor is optically coupled to the plurality of third grating blocks of the third wavelength selectivity, and configured to extract light of a third color diffracted by the plurality of third grating blocks of the third wavelength selectivity into extracted light of the third color.

Optionally, the light source comprises a light emitting element and a light converging element configured to converge light emitted from the light emitting element into a converged light having a divergence angle between an outmost light beam of the converged light and a normal direction to the first surface, the divergence angle being equal to or less than 30°.

Optionally, a respective one of the plurality of grating blocks is a volume Bragg grating.

Optionally, the light converging element comprises a converging reflective mirror having a reflective surface on a side of the light emitting element away from the unitary grating plate, and configured to reflect light from the light emitting element to form the converged light.

Optionally, the light converging element comprises a converging lens.

Optionally, at least two grating blocks of a same wavelength selectivity are directly adjacent to each other, and form a grating group of the same wavelength selectivity for diffracting light of a same color.

Optionally, the plurality of grating blocks are directly adjacent to each other.

BRIEF DESCRIPTION OF THE FIGURES

The following drawings are merely examples for illustrative purposes according to various disclosed embodiments and are not intended to limit the scope of the present invention.

FIG. 3A is a schematic diagram illustrating a divergence angle of a converged light from light source in some embodiments according to the present disclosure.

FIG. 3B is a schematic diagram illustrating light intensity of a radiation region of a unitary grating plate irradiated by a converged light emitted from a light source in some embodiments according to the present disclosure.

FIG. 3C is a schematic diagram of an arrangement of a plurality of grating blocks of different wavelength selectivity on a radiation region of a unitary grating plate irradiated by a converged light emitted from a light source in some embodiments according to the present disclosure.

DETAILED DESCRIPTION

Figure 1A:
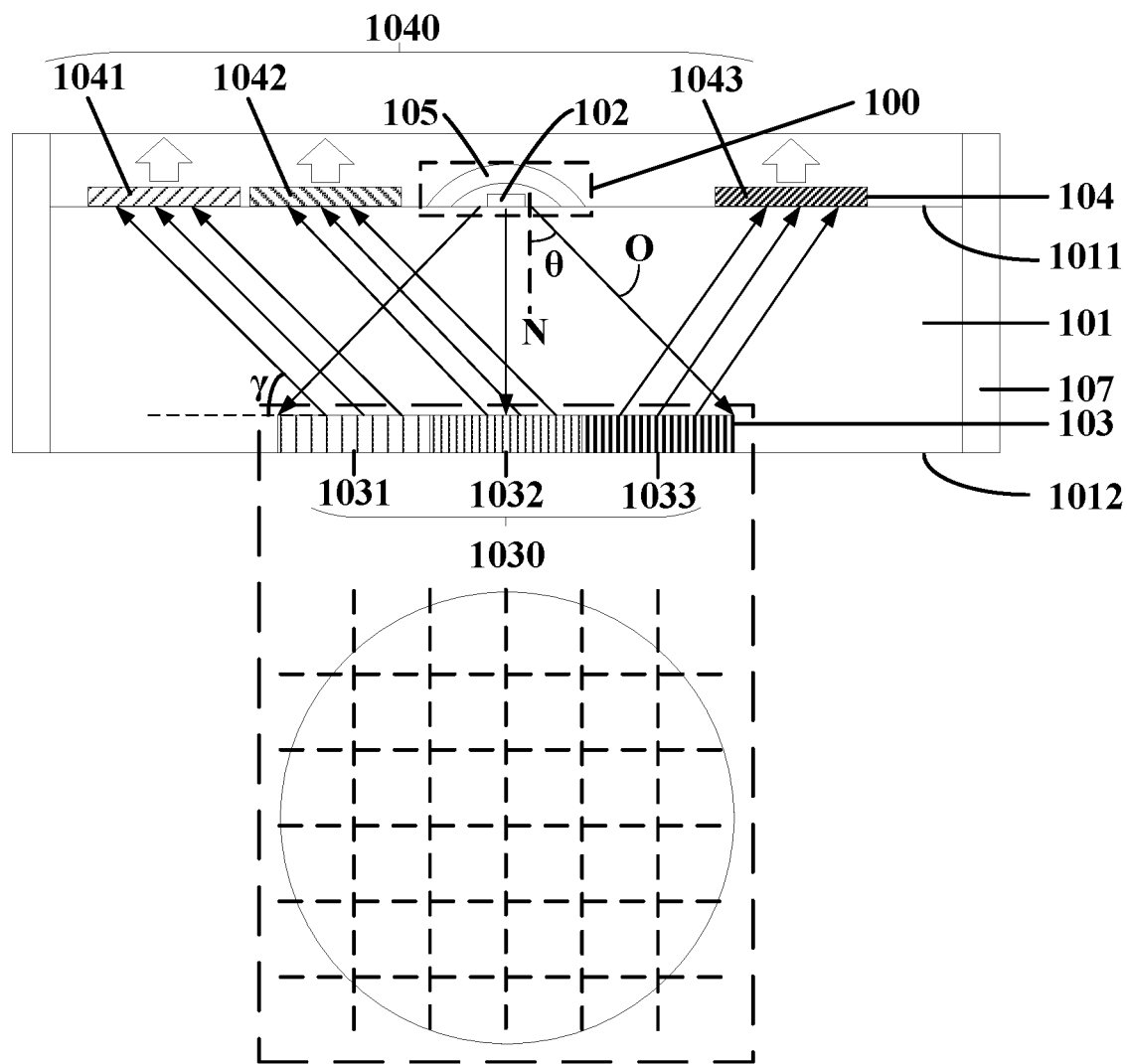
FIG. 1A is a schematic diagram illustrating a structure of a spectrometer in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Color separation gratings are used in the microfluidic apparatus. Occasionally, a selected wavelength range of light obtained after going through a color separation grating are not narrow enough. In order to have light having a narrow wavelength range and high light intensity, incident light toward the color separation grating should be collimated light. The collimation degree of the incident light affects the light intensity and the wavelength range of the light going out of the color separation grating.

Also, incident light toward the color separation grating is limited to collimated light, which enhances the cost of fabricating the microfluidic apparatus having the color separation grating, and increases the difficulties of fabricating the microfluidic apparatus.

Accordingly, the present disclosure provides, inter alia, a microfluidic apparatus, a method of detecting a substance in a microfluidic apparatus, and a spectrometer that substantially obviate one or more of the problems due to limitations and disadvantages of the related art. In one aspect, the present disclosure provides a microfluidic apparatus. In some embodiments, the microfluidic apparatus includes a first substrate; and a microfluidic layer on the first substrate and defining a microfluidic channel. Optionally, the first substrate having a first side closer to the microfluidic layer, and a second side away from the microfluidic layer, the first side and the second side opposite to each other. In some embodiments, the microfluidic apparatus includes a plurality of detectors on a side of the microfluidic channel away from the first substrate; and a unitary grating plate on the second side of the first substrate and including a plurality of grating blocks of different wavelength selectivity. Optionally, the microfluidic apparatus further includes a light source on the first side of the first substrate. Optionally, the unitary grating plate is configured to diffract light emitted from the light source transmitted through the first substrate. In some embodiments, the microfluidic apparatus includes a light extraction layer including a plurality of light extractors on the first side of the first substrate and configured to extract light diffracted by the plurality of grating blocks out of the first substrate. Optionally, a respective one of the plurality of light extractors is optically coupled to grating blocks of a same wavelength selectivity of the plurality of grating blocks, and configured to extract light of a same color diffracted by the grating blocks of the same wavelength selectivity into extracted light of a same color. Optionally, grating blocks of different wavelength selectivity are configured to respectively diffract light of different colors into different light extractors of the plurality of light extractors. Optionally, a respective one of the plurality of detectors is configured to detect the extracted light of a same color transmitted through the microfluidic channel. Optionally, different detectors of the plurality of detectors are configured to respectively detect extracted light of different colors respectively from different light extractors of the plurality of light extractors.

As used herein, the term "wavelength selectivity" refers to a respective one of the plurality of grating blocks selectively diffracting light of a selected wavelength range. Optionally, grating blocks of different wavelength selectivity respectively diffract light of different wavelength ranges (e.g. light of different colors). Optionally, grating blocks of different wavelength selectivity respectively diffract light of non-overlapping wavelength ranges. Optionally, grating blocks of the same wavelength selectivity diffract light of a same wavelength range (e.g. light of a same color).

As used herein, the term "optically coupled" refers to at least one coupled element being adapted to impart light to another coupled element directly or indirectly. For example, a respective one of grating blocks of a same wavelength selectivity of the plurality of grating blocks is adapted to impart light to a respective one of the plurality of light extractors.

In another aspect, the present disclosure also provides a spectrometer. FIG. 1A is a schematic diagram illustrating a structure of a spectrometer in some embodiments according to the present disclosure. Referring to FIG. 1A, in some embodiments, the spectrometer includes a first substrate 101 having a first side 1011 and a second side 1012; a light source 100 on the first side 1011 of the first substrate 101; a unitary grating plate 103 on the second side 1012 of the first substrate 101; and a light extraction layer 104 on the first side 1011 of the first substrate 101.

In some embodiments, the first side 1011 of the first substrate 101 and the second side 1012 of the second substrate 108 are opposite to each other. Optionally, the first substrate 101 is substantially transparent. As used herein, the term "substantially transparent" means at least 50 percent (e.g., at least 60 percent, at least 70 percent, at least 80 percent, at least 90 percent, and at least 95 percent) of an incident light in the visible wavelength range transmitted therethrough.

Various appropriate materials may be used for making the first substrate 101. Example of materials suitable for making the first substrate 101 include, but are not limited to, glass, resin, polyester compound, and paper.

In some embodiments, the unitary grating plate 103 includes a plurality of grating blocks 1030 of different wavelength selectivity. Optionally, the unitary grating plate 130 is configured to diffract light emitted from the light source 100 transmitted through the first substrate 101.

Optionally, the plurality of grating blocks 1030 of different wavelength selectivity diffract light of different color (e.g. light of different wavelength ranges) into different regions of the first side 1011 of the first substrate 101.

Optionally, at least two grating blocks of a same wavelength selectivity are directly adjacent to each other, and form a grating group of the same wavelength selectivity for diffracting light of a same color.

In some embodiments, the unitary grating plate 130 has a square grid shape. Optionally, the square grid unitary grating plate has a plurality grids, a respective one of the plurality of grids corresponds to a respective one of the plurality of grating blocks 1030. In one example, a portion of light emitted from the light source 100 irradiates on the respective one of the plurality of grating blocks 1030 with a respective incident angle θ between a direction of the portion of light and the normal direction of the unitary grating plate 130. In another example, different portions of light emitted from the light source 100 irradiate on different grating blocks of the plurality of grating blocks 1030 with different incident angles between directions of different portions of light and the normal direction of the unitary grating plate 130.

In some embodiments, the respective one of the plurality of grating blocks 1030 is a half-wavelength grating structure configured to diffract light having a selected wavelength to the first substrate 101. Optionally, a duty cycle of the respective one of the plurality of grating blocks 1030 is 0.5.

In some embodiments, a height of the respective one of the plurality of grating blocks 1030 is determined by a light intensity of the light irradiating on the respective one of the plurality of grating blocks 1030. Optionally, the height of the respective one of the plurality of grating blocks 1030 is in nano-scale. Optionally, the height of the respective one of the plurality of grating blocks 1030 is in micron-scale.

In some embodiments, a respective one of the plurality of grating blocks 1030 is a volume Bragg grating. Optionally, the respective one of the plurality of grating blocks 1030 is a transmissive volume Bragg grating. Optionally, the respective one of the plurality of grating blocks 1030 is a reflective volume Bragg grating.

Various appropriate materials may be used for making the unitary grating plate 103. Examples of materials suitable for making the unitary grating plate 103 include, but are not limited to, $SiN_x$, $SiO_2$, polymethyl methacrylate (PMMA), resin, and metal materials. Optionally, metal materials include, but are not limited to, aluminum and silver.

In some embodiments, the unitary grating plate 103 includes light filtering structures configured to transmit light having different wavelength ranges. Example of devices suitable for making the light filtering structures include, but are not limited to, micro-reflective mirrors, and gratings.

In some embodiments, the light extraction layer 104 includes a plurality of light extractors 1040 on the first side 1011 of the first substrate 101. Optionally, the light extraction layer 104 is configured to extract light diffracted by the plurality of grating blocks 1030 out of the first substrate 101.

Optionally, the plurality of light extractors 1040 are spaced apart from each other.

Optionally, a respective one of the plurality of light extractors 1040 is a half-wavelength grating structure configured to extract light having a selected wavelength and to filter out light without the selected wavelength.

In some embodiments, a respective one of the plurality of light extractors 1040 is optically coupled to grating blocks of a same wavelength selectivity of the plurality of grating blocks 1030, and configured to extract light of a same color diffracted by the grating blocks of the same wavelength selectivity into extracted light of a same color.

Optionally, grating blocks of different wavelength selectivity of the plurality of grating blocks 1030 are configured to respectively diffract light of different colors into different light extractors of the plurality of light extractors 1040.

For example, the respective one of the plurality of grating blocks 1030 receives light emitted from the light source 100 and transmitted through the first substrate 101, and reflects and diffracts light having a selected color (e.g. light having a selected wavelength range) of light from the light source 100 to the respective one of the plurality of light extractors 1040 with an diffraction angle γ between the direction of diffracted light and the second surface 1012 of the first substrate 101. The diffraction angle γ may be different when the plurality of grating blocks 1030 diffracts light of different colors (e.g. different light having different wavelength ranges). By diffracting light of different colors with different angle γ, different light of different colors is diffracted toward different regions of the first side 1011 of the first substrate 101 corresponding to different light extractors of the plurality of light extractors 1040. So, different light extractors of the plurality of light extractors 1040 can extract light of different colors toward microfluidic channels to detect substances in the microfluidic channels.

Optionally, the diffraction angle γ of light diffracted by a respective one of the plurality grating blocks 1030 can be adjusted based on a location of the respective one of the of the plurality of grating blocks 1030 and a region of the first side 1011 of the first substrate 101 where the diffracted light is designed to reach. Optionally, a period of the respective one of the plurality of grating blocks 1030 is determined by the diffracted light with a selected wavelength range, the refractive index of the first substrate 101, the incident angle between the direction of the light emitted from the light source 100 toward the respective one of the plurality of grating blocks 1030, the normal direction of the unitary grating plate 130, and the diffraction angle γ of the diffracted light diffracted by the respective one of the plurality grating blocks 1030.

In some embodiments, the plurality of grating blocks 1030 of different wavelength selectivity includes a plurality of first grating blocks 1031 of a first wavelength selectivity and a plurality of second grating blocks 1032 of a second wavelength selectivity. The plurality of light extractors 1040 includes a first light extractor 1041 and a second light extractor 1042.

In one example, the first light extractor 1041 is optically coupled to the plurality of first grating blocks 1031 of the first wavelength selectivity and configured to extract light of a first color diffracted by the plurality of first grating blocks 1031 of the first wavelength selectivity into extracted light of the first color.

In another example, the second light extractor 1042 is optically coupled to the plurality of second grating blocks 1032 of the second wavelength selectivity, and configured to extract light of a second color diffracted by the plurality of second grating blocks 1032 of the second wavelength selectivity into extracted light of the second color.

Optionally, the extracted light of the first color and the extracted light of the second color are selected from a group consisting of red light, green light, and blue light.

In some embodiments, the plurality of grating blocks 1030 of different wavelength selectivity includes a plurality of first grating blocks 1031 of a first wavelength selectivity, a plurality of second grating blocks 1032 of a second wavelength selectivity, and a plurality of third grating blocks 1033 of a third wavelength selectivity. The plurality of light extractors 1040 include a first light extractor 1041, a second light extractor 1042, and a third light extractor 1043.

In one example, the first light extractor 1041 is optically coupled to the plurality of first grating blocks 1031 of the first wavelength selectivity, and configured to extract light of a first color diffracted by the plurality of first grating blocks 1031 of the first wavelength selectivity into extracted light of the first color.

In another example, the second light extractor 1042 is optically coupled to the plurality of second grating blocks 1032 of the second wavelength selectivity, and configured to extract light of a second color diffracted by the plurality of second grating blocks 1032 of the second wavelength selectivity into extracted light of the second color.

In another example, the third light extractor 1043 is optically coupled to the plurality of third grating blocks 1033 of the third wavelength selectivity, and configured to extract light of a third color diffracted by the plurality of third grating blocks 1033 of the third wavelength selectivity into extracted light of the third color.

Optionally, the extracted light of the first color is red light. Optionally, the extracted light of the second color is green light. Optionally, the extracted light of the third color is blue light.

In some embodiments, the respective one of the plurality of light extractors 1040 is configured to collimate light of a same color diffracted by the grating blocks of the same wavelength selectivity into substantially collimated light of a same color.

As used herein, the term "substantially collimated light" refers to light having substantially the same direction and having substantially parallel rays. Optionally, the diverging angle of the substantially collimated light between an outmost light beam and the central light beam is no more than 10°, e.g. no more than 8°, no more than 6°, no more than 4°, or no more than 2°. Optionally, the divergence of the substantially parallel rays is no more than 10°, e.g. no more than 8°, no more than 6°, no more than 4°, or no more than 2°.

In some embodiments, the respective one of the plurality of light extractors 1040 is a transmissive grating configured to collimate light of the same color diffracted by the grating blocks of the same wavelength selectivity into substantially collimated light of the same color.

By extracting substantially collimated light using the plurality of light extractors 1040, the light intensity of the extracted light (e.g. the collimated light) from the plurality of light extractor 1040 is enhanced, which may improve microfluidic detection results using the spectrometer described herein.

Figure 1B:
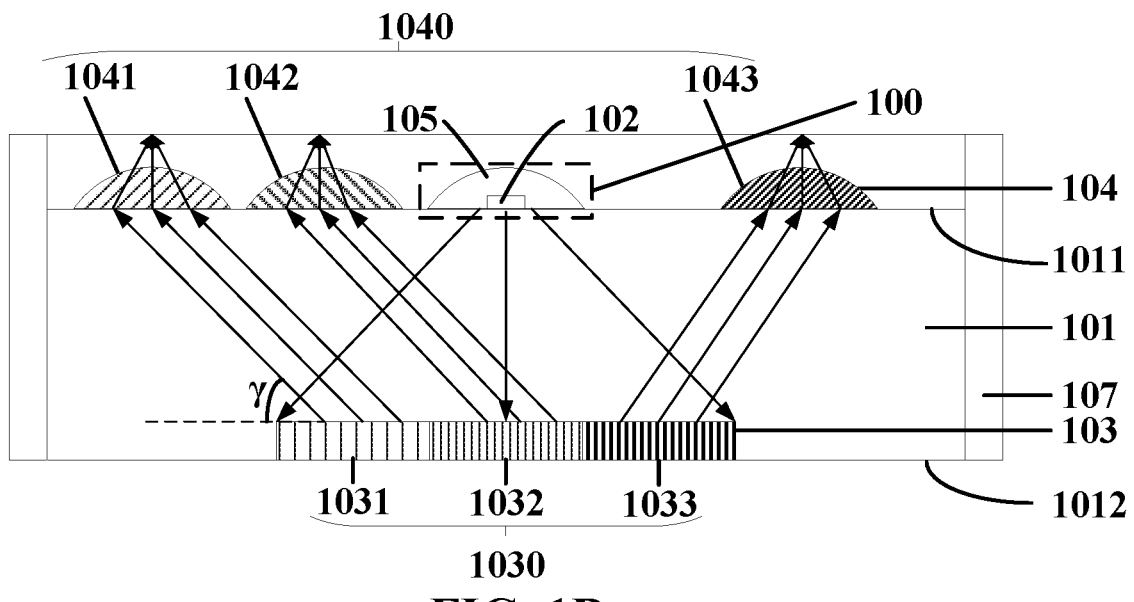
FIG. 1B is a schematic diagram illustrating a structure of a spectrometer in some embodiments according to the present disclosure.

FIG. 1B is a schematic diagram illustrating a structure of a spectrometer in some embodiments according to the present disclosure. Referring to FIG. 1B, in some embodiments, the respective one of the plurality of light extractors 1040 is configured to converge light of a same color diffracted by the grating blocks of the same wavelength selectivity into focused light converging on a converging point.

In some embodiments, the respective one of the plurality of light extractors 1040 is a micro-lens configured to converge light of a same color diffracted by the grating blocks of the same wavelength selectivity into focused light converging on the converging point.

For example, the respective one of the plurality of grating blocks 1030 diffracts light toward a respective region of the first side 1011 of the first substrate 101 corresponding to the respective one of the plurality of light extractors 1040 (e.g. the micro-lens). The diffracted light from the respective one of the plurality of grating blocks 1030 are substantially collimated light. And the respective one of the plurality of light extractors 1040 (e.g. the micro-lens) converges the diffracted light into focused light on the converging point.

By extracting focused light using the plurality of light extractors 1040, the light intensity of the extracted light (e.g. the focused light) from the plurality of light extractor 1040 is enhanced, which may improve microfluidic detection results using the spectrometer described herein.

In some embodiments, referring to FIG. 1A and FIG. 1B, the light source 100 includes a light emitting element 102 and a light converging element 105 configured to converge light emitted from the light emitting element 102 into a converged light having a divergence angle θ between an outmost light beam O of the converged light and a normal direction N to the first side 1011. For example, the light converging element 105 can converge the divergent angle of light emitted from the light emitting element 102 into the converged light toward the unitary grating plate 103. The converged light emitting from the light source 100 can increase the accuracy of color separation, and it is easier for the plurality of light extractor 1040 to collimate light into substantially collimated light or to converge light into focused light.

Optionally, the light source 100 is a light source emitting un-collimated light having broad spectrum. Optionally, the light emitting element 102 is selected from a group consisting of a micro-LED light source and a semiconductor laser chip. Optionally, the light source 100 emits white light.

Optionally, the divergence angle θ is equal to or less than 30°.

Optionally, referring to FIG. 1A, the light converging element 105 includes a converging reflective mirror having a reflective surface on a side of the light emitting element 102 away from the unitary grating plate 103, and configured to reflect light from the light emitting element 102 to form the converged light toward the unitary grating plate 103.

For example, the converging reflective mirror can not only reflect light from the light emitting element 102 to form the converged light toward the unitary grating plate 103, but also prevent the light from the light emitting element from transmitting to the substance in the microfluidic channel, which may reduce the adversary effect on the detection of the substance. Moreover, the converging reflective mirror can reflect light haven't be separated by the unitary grating plate 103 back to the second side 1012 of the first substrate 101, which enhance the light utilization rate and light intensity of the light emitted from the light source 100.

Optionally, referring to FIG. 1B, the light converging element 105 is a converging lens configured to converge light from the light emitting element 102 to form the converged light. Optionally, the light converging element 105 is a combination of the converging reflective mirror and the converging lens.

In some embodiments, the spectrometer using the converged light emitted from the light source 100 may increasingly decrease the cost of fabricating the spectrometer described herein. Also, even though the spectrometer separates the converged light having broad spectrum, not a collimated light, the spectrometer can still separate light into different light having relatively narrow wavelength ranges.

Figure 1C:
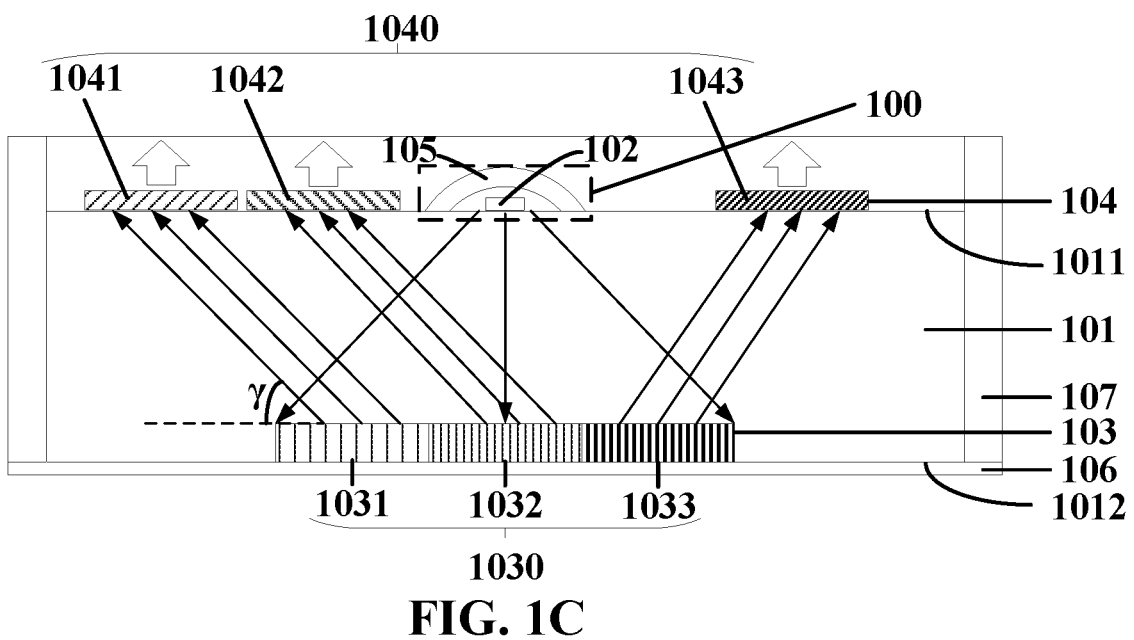
FIG. 1C is a schematic diagram illustrating a structure of a spectrometer in some embodiments according to the present disclosure.

FIG. 1C is a schematic diagram illustrating a structure of a spectrometer in some embodiments according to the present disclosure. Referring to FIG. 1C, in some embodiments, the spectrometer further includes a reflective protection layer 106 on a side of the unitary grating plate 103 away from the first substrate 101. For example, the reflective protection layer 106 can prevent the spectrometer from being contaminated and damaged, and can enhance the light utilization rate of light emitted from the light source 100 and enhance the light intensity of the light extracted by the plurality of light extractors.

In some embodiments, the spectrometer further includes a sealing element 107 on a side of a lateral side of the first substrate 101 connecting the first side 1011 and the second side 1012 of the first substrate 101. Optionally, the sealing element 107 and the reflective protection layer 106 together assemble into a cell protecting elements of the spectrometer, to prevent the spectrometer from being damaged, and to put the spectrometer ready for transportation.

Figure 2:
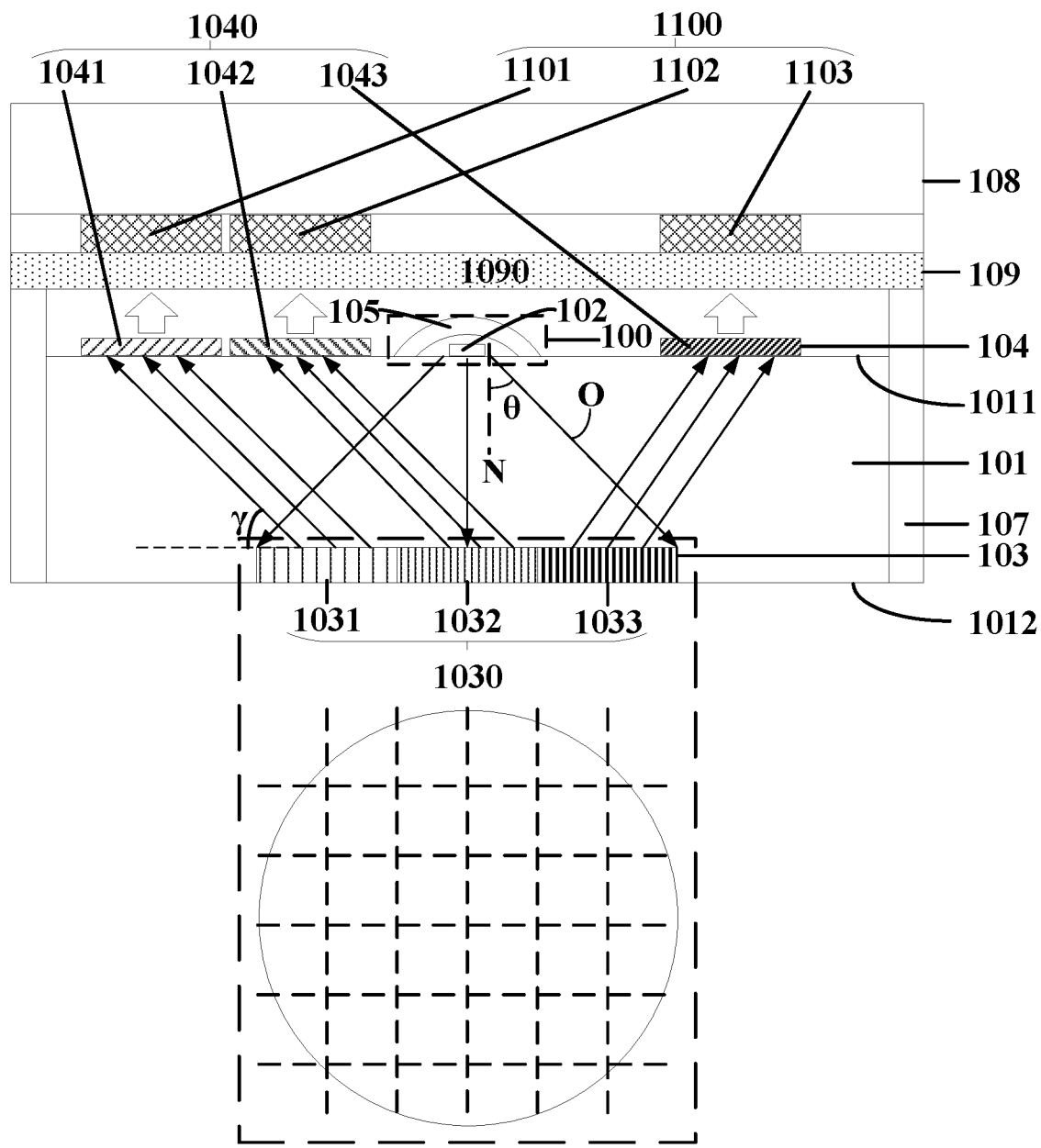
FIG. 2 is a schematic diagram illustrating a structure of a microfluidic apparatus in some embodiments according to the present disclosure.

In another aspect, the present disclosure provides a microfluidic apparatus. FIG. 2 is a schematic diagram illustrating a structure of a microfluidic apparatus in some embodiments according to the present disclosure. Referring to FIG. 2, in some embodiments, the microfluidic apparatus includes a first substrate 101; and a microfluidic layer 109 on the first substrate 101. Optionally, the microfluidic layer 109 defines a microfluidic channel 1090. Optionally, the first substrate 101 has a first side 1011 closer to the microfluidic layer 109, and a second side 1012 away from the microfluidic layer 109. For example, the first side 1011 and the second side 1012 are opposite to each other.

Optionally, the microfluidic apparatus includes a plurality of detectors 1100 on a side of the microfluidic channel 1090 away from the first substrate 101; a unitary grating plate 103 on the second side 1012 of the first substrate 101. Optionally, the unitary grating plate 103 includes a plurality of grating blocks 1030 of different wavelength selectivity.

Optionally, the microfluidic apparatus includes a light source 100 on the first side 1011 of the first substrate 101. Optionally, the unitary grating plate 103 is configured to diffract light emitted from the light source 100 transmitted through the first substrate 101.

Optionally, the microfluidic apparatus includes a light extraction layer 104 including a plurality of light extractors 1040 on the first side 1011 of the first substrate 101 and configured to extract light diffracted by the plurality of grating blocks 1030 out of the first substrate 101.

Optionally, a respective one of the plurality of light extractors 1040 is optically coupled to grating blocks of a same wavelength selectivity of the plurality of grating blocks 1030, and configured to extract light of a same color diffracted by the grating blocks of the same wavelength selectivity into extracted light of a same color. Optionally, grating blocks of different wavelength selectivity are configured to respectively diffract light of different colors into different light extractors of the plurality of light extractors 1040.

Optionally, a respective one of the plurality of detectors 1100 is configured to detect the extracted light of a same color transmitted through the microfluidic channel 1090. Optionally, different detectors of the plurality of detectors 1100 are configured to respectively detect extracted light of different colors respectively from different light extractors of the plurality of light extractors 1040.

In some embodiments, the microfluidic apparatus is used to detect a substance or a character of the substance by having physical or chemical reactions between the substance and light having a selected wavelength range.

In one example, the extracted light of a same color transmits through the microfluidic channel 1090, and has a reaction with the substance in the microfluidic channel 1090 to become light reflecting characters of the substance in the microfluidic channel 1090. Subsequently, the light reflecting characters of the substance is detected by the respective one of the plurality of detectors 1100.

In another example, the extracted light of different colors transmits through different microfluidic channels containing different substances to become light reflecting different characters of the different substance in different microfluidic channel. The light reflecting different characters of the different substance in different microfluidic channel is detected by different detectors of the plurality of detectors 1100. Optionally, the extracted light of different colors transmits through different regions of a same microfluidic channel, wherein different regions of the same microfluidic channel contains different substances. The light reflecting different characters of the different substance in different region of the same microfluidic channel is detected by different detectors of the plurality of detectors 1100. So, the microfluidic apparatus can detect different substances or different characters of a same substance at the same time.

In some embodiments, the microfluidic apparatus further includes a second substrate 108 on a side of the plurality of detectors 1100 away from the microfluidic channel 1090.

In some embodiments, the microfluidic apparatus includes a spectrometer described herein.

In some embodiments, referring to FIG. 2, the plurality of detectors 1100 includes a first detector 1101 and a second detector 1102. The plurality of grating blocks 1030 of different wavelength selectivity includes a plurality of first grating blocks 1031 of a first wavelength selectivity and a plurality of second grating blocks 1032 of a second wavelength selectivity. The plurality of light extractors 1040 includes a first light extractor 1041 and a second light extractor 1042.

Optionally, the first light extractor 1041 is optically coupled to the plurality of first grating blocks 1031 of the first wavelength selectivity, and configured to extract light of a first color diffracted by the plurality of first grating blocks 1031 of the first wavelength selectivity into extracted light of the first color. Optionally, the second light extractor 1042 is optically coupled to the plurality of second grating blocks 1032 of the second wavelength selectivity, and configured to extract light of a second color diffracted by the plurality of second grating blocks 1032 of the second wavelength selectivity into extracted light of the second color.

Optionally, the first detector 1101 is configured to detect at least portion of the extracted light of the first color transmitted through the microfluidic channel 1090. Optionally, the second detector 1102 is configured to detect at least portion of the extracted light of the second color transmitted through the microfluidic channel 1090.

Optionally, the extracted light of the first color and the extracted light of the second color are selected from a group consisting of red light, green light, and blue light.

In some embodiments, referring to FIG. 2, the plurality of detectors 1100 include a first detector 1101, a second detector 1102, and a third detector 1103. The plurality of grating blocks 1030 of different wavelength selectivity include a plurality of first grating blocks 1031 of a first wavelength selectivity, a plurality of second grating blocks 1032 of a second wavelength selectivity, and a plurality of third grating blocks 1033 of a third wavelength selectivity. The plurality of light extractors 1040 include a first light extractor 1041, a second light extractor 1042, and a third light extractor 1043.

Optionally, the first light extractor 1041 is optically coupled to the plurality of first grating blocks 1031 of the first wavelength selectivity, and configured to extract light of a first color diffracted by the plurality of first grating blocks 1031 of the first wavelength selectivity into extracted light of the first color. Optionally, the second light extractor 1042 is optically coupled to the plurality of second grating blocks 1032 of the second wavelength selectivity, and configured to extract light of a second color diffracted by the plurality of second grating blocks 1032 of the second wavelength selectivity into extracted light of the second color. Optionally, the third light extractor 1043 is optically coupled to the plurality of third grating blocks 1033 of the third wavelength selectivity, and configured to extract light of a third color diffracted by the plurality of third grating blocks 1033 of the third wavelength selectivity into extracted light of the third color.

Optionally, the first detector 1101 is configured to detect at least portion of the extracted light of the first color transmitted through the microfluidic channel 1090. Optionally, the second detector 1102 is configured to detect at least portion of the extracted light of the second color transmitted through the microfluidic channel 1090. Optionally, the third detector 1103 is configured to detect at least portion of the extracted light of the third color transmitted through the microfluidic channel 1090.

Optionally, the extracted light of the first color is red light. Optionally, the extracted light of the second color is green light. Optionally, the extracted light of the third color is blue light.

In some embodiments, the respective one of the plurality of light extractors 1040 is configured to collimate light of a same color diffracted by the grating blocks of the same wavelength selectivity into substantially collimated light of a same color.

Optionally, the respective one of the plurality of detectors 1100 is configured to detect the substantially collimated light of a same color transmitted through the microfluidic channel 1090.

Optionally, different detectors of the plurality of detectors 1100 are configured to respectively detect substantially collimated light of different colors respectively from different light extractors of the plurality of light extractors 1040.

Optionally, the respective one of the plurality of light extractors 1040 is a transmissive grating configured to collimate light of the same color diffracted by the grating blocks of the same wavelength selectivity into substantially collimated light of the same color.

In some embodiments, the respective one of the plurality of light extractors 1040 is configured to converge light of a same color diffracted by the grating blocks of the same wavelength selectivity into focused light converging on a converging point.

Optionally, the respective one of the plurality of detectors 1100 is configured to detect the focused light of a same color transmitted through the microfluidic channel. Optionally, the converging point is on the respective one of the plurality of detectors 1100.

Optionally, different detectors of the plurality of detectors 1100 are configured to respectively detect focused light of different colors respectively from different light extractors of the plurality of light extractors 1040.

In some embodiments, the respective one of the plurality of light extractors 1040 is a micro-lens configured to converge light of a same color diffracted by the grating blocks of the same wavelength selectivity into focused light converging on the converging point.

For example, referring to FIG. 1B and FIG. 2, the respective one of the plurality of grating blocks 1030 diffracts light to a respective region of the first side 1011 of the first substrate 101 corresponding to the respective one of the plurality of light extractors 1040 (e.g. the micro-lens). The diffracted light from the respective one of the plurality of grating blocks 1030 are substantially collimated light. And the respective one of the plurality of light extractors 1040 (e.g. the micro-lens) converges the diffracted light into focused light on the converging point. The converging point is on the respective one of the plurality of detectors 1100. So, the focused light transmit through the microfluidic channel 1090 to detect substance in the microfluidic channel and take the information of the substance to the respective one of the plurality of detectors 1100.

In some embodiments, the substance in the microfluidic channel 1090 is microfluid. Optionally, the substance in the microfluidic channel 1090 is gas.

In some embodiments, the microfluidic channel 1090 can be replaced with other type of channels.

In some embodiments, a width or a height of the microfluidic channel 1090 is at nano scale. Various appropriate methods may be used to form the microfluidic channel 1090. Examples of method suitable for making the microfluidic channel 1090 include, but are not limited to etching silicon materials, etching glass materials, etching polymeric materials such as PDMS and PMMA. Optionally, etching include, but are not limited to, lithography.

Optionally, an inner surface of the microfluidic channel 1090 can be treated to change the moving speed of substance flowing through the microfluidic channel 1090. Optionally, a hydrophilic layer or a hydrophobic layer may be formed on the inner surface of the microfluidic channel 1090, to control the moving speed of the substance in the microfluidic channel 1090, and prevent the substance from adhering to the inner surface of the microfluidic channel 1090. Optionally, the hydrophobic layer is made of Teflon™ AF materials.

In some embodiments, the plurality of detectors 1100 are photosensors. A respective one of the plurality of detectors 1100 corresponds to a respective one of the plurality of light extractors 1040. The respective one of the plurality of detectors 1100 is optically coupled to the respective one of the plurality of light extractors 1040.

Optionally, a normal distance between the respective one of the plurality of detectors 1100 and the respective one of the plurality of light extractors 1040 is determined by a direction of light extracted by the respective one of the plurality of light extractors 1040 and a sign-to-noise requirement of the microfluidic channel 1090. In one example, only the microfluidic layer 109 is formed between the respective one of the plurality of light extractors 1040 and the respective one of the plurality of detectors 1100. In another example, a buffer layer is formed between the respective one of the plurality of light extractors 1040 and the respective one of the plurality of detectors 1100.

Optionally, the respective one of the plurality of detectors 1100 is one or a combination of a charge coupled device (CCD), a complementary metal oxide semiconductor device (CMOS), and a PIN.

In some embodiments, the light source 100 includes a light emitting element 102 and a light converging element 105 configured to converge light emitted from the light emitting element into a converged light having a divergence angle $\theta$ between an outmost light beam O of the converged light and a normal direction N to the first side 1011. Optionally, the divergence angle $\theta$ is equal to or less than 30°.

Optionally, the light converging element 105 includes a converging reflective mirror having a reflective surface on a side of the light emitting element 102 away from the unitary grating plate 103, and configured to reflect light from the light emitting element 102 to form the converged light toward the unitary grating plate 103.

Optionally, referring to FIG. 1B and FIG. 2, the light converging element 105 is a converging lens configured to converge light from the light emitting element 102 to form the converged light. Optionally, the light converging element 105 is a combination of the converging reflective mirror and the converging lens.

Optionally, the light emitting element 102 is selected from a group consisting of a micro-LED light source and a semiconductor laser chip.

In some embodiments, the respective one of the plurality of grating blocks 1030 is a volume Bragg grating. Optionally, the respective one of the plurality of grating blocks 1030 is a transmissive volume Bragg grating. Optionally, the respective one of the plurality of grating blocks 1030 is a reflective volume Bragg grating.

In some embodiments, at least two grating blocks of a same wavelength selectivity are directly adjacent to each other, and form a grating group of the same wavelength selectivity for diffracting light of a same color.

In some embodiments, the plurality of grating blocks 1030 are directly adjacent to each other.

In some embodiments, the light emitting element 102 is a micro-LED light source. Referring to FIG. 2, the unitary grating plate 103 is a three-dimensional grating. The plurality of grating blocks 1030 are a plurality of three-dimensional grating blocks.

Optionally, a respective one of the plurality of grating blocks 1030 include a first dimension along an X-axis, a second dimension along a Y-axis, and a third dimension along a Z-axis. For example, the X-axis and the Y-axis forms an X-Y plane, and the Z-axis is perpendicular to the X-Y plane FIG. 3A is a schematic diagram illustrating a divergence angle of a converged light from light source in some embodiments according to the present disclosure. Referring to FIG. 3A, in some embodiments, the divergence angle θ of the converged light emitted from the light source 100 is 30°. The converged light emitted from the light source 100 having the divergence angle 30° transmits through the first substrate 101 in FIG. 2.

FIG. 3B is a schematic diagram illustrating light intensity of a radiation region of a unitary grating plate irradiated by a converged light emitted from a light source in some embodiments according to the present disclosure. Referring to FIG. 3B, using a software LightTools, the radiation region of the unitary grating plate 103 irradiated by the converged light emitted from the light source 100 can be calculated. Optionally, the radiation region irradiated by the converged light is a circular shape. For example, the light intensity of a center of the radiation region is stronger than the light intensity of regions surrounding the center of the radiation region.

Figure 3D:
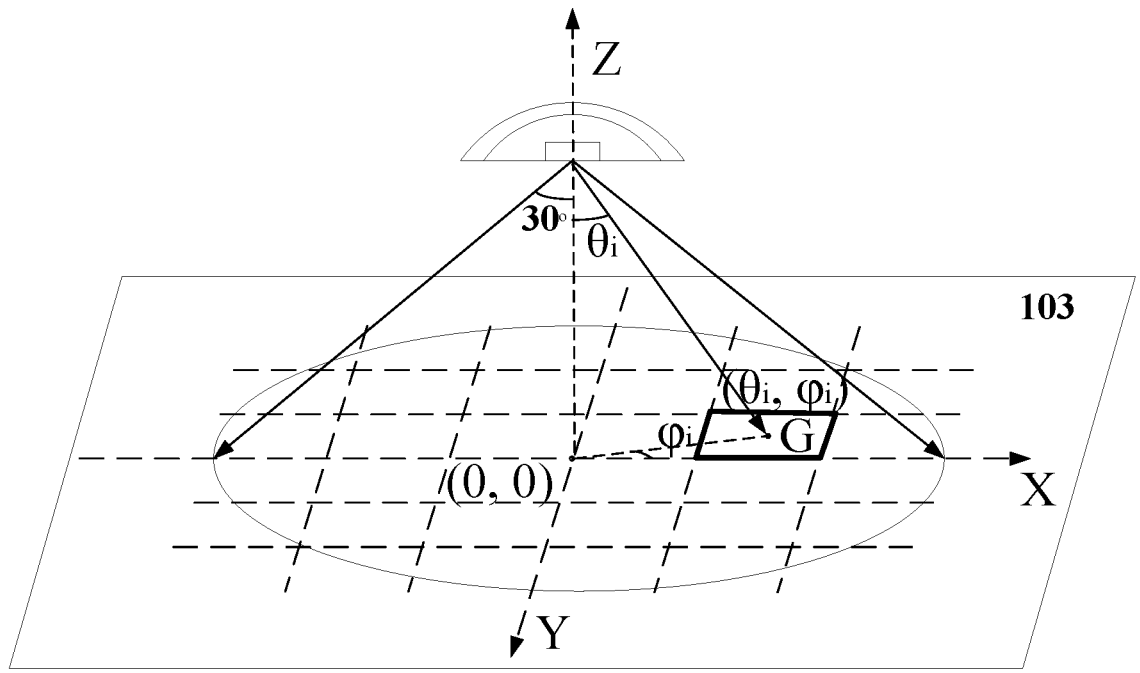
FIG. 3D is a schematic diagram of an arrangement of a plurality of grating blocks of different wavelength selectivity on a radiation region of a unitary grating plate irradiated by a converged light emitted from a light source in some embodiments according to the present disclosure.

FIG. 3C and FIG. 3D are a schematic diagram of an arrangement of a plurality of grating blocks of different wavelength selectivity on a radiation region of a unitary grating plate irradiated by a converged light emitted from a light source in some embodiments according to the present disclosure. Referring to FIG. 3C and FIG. 3D, in some embodiments, the radiation region of the unitary grating plate 103 can be divided into regions corresponding to the plurality of grating blocks 1030. A coordinate of the respective one of the plurality of grating blocks 1030 is represented by an incident angle ($\theta_i$, $\varphi_i$) of light emitted from the light source 100 and irradiating on a center of the respective one of the plurality of grating blocks 1030. $\theta_i$ is a divergence angle between a light beam irradiating at the center of the respective one of the plurality of grating blocks 1030 and a Z-axis direction (e.g. normal direction N to the first side 1011). $\varphi_i$ is an angle between an orthographic projection of light beam irradiating at the center of the respective one of the plurality of grating blocks 1030 on a X-Y plane, and an X-axis direction.

In some embodiments, the respective one of the plurality of grating blocks 1030 should satisfies a following equation (1) to diffract light:

$$n_i(\sin\theta_i\cos\varphi_i) - n_d(\sin\theta_d\cos\varphi_d) = m\frac{\lambda}{\Lambda}\sin\theta_g; \quad (1)$$

wherein m=0, +/−1, 2, . . . .

Based on the equation (1), a period $\Lambda_x$ along the X-axis of the respective one of the plurality of grating blocks 1030 is calculated using a following equation (2):

$$\Lambda_x = \frac{m\lambda}{n_i(\sin\theta_i\cos\varphi_i) - n_d(\sin\theta_d\cos\varphi_d)}; \quad (2)$$

Based on the equation (1), a period $\Lambda_y$ along the Y-axis of the respective one of the plurality of grating blocks 1030 is calculated using a following equation (3):

$$\Lambda_y = \frac{m\lambda}{n_i(\sin\theta_i\sin\varphi_i) - n_d(\sin\theta_d\sin\varphi_d)}; \quad (3)$$

So, a period Λ of the respective one of the plurality of grating blocks 1030 is calculated using a following equation (4):

$$\Lambda = \sqrt{\Lambda_x^2 + \Lambda_y^2} \quad (4);$$

An arrangement direction of fringes of a respective one of the plurality of grating blocks 1030 may be expressed as an angle $\theta_g$ between the X-axis and a direction of a fringe line of the respective one of the plurality of grating blocks 1030 and calculated using an equation (5):

$$\theta_g = \arctan(\Lambda_y/\Lambda_x) \quad (5);$$

wherein Λ represents the period of the respective one of the plurality of grating blocks 1030, $\Lambda_x$ represents the period along the X-axis of the respective one of the plurality of grating blocks 1030, $\Lambda_y$ represents the period along the Y-axis of the respective one of the plurality of grating blocks 1030, $\theta_g$ is an angle between the X-axis and the direction of a fringe line of the respective one of the plurality of grating blocks 1030, $n_i$ represents a refractive index of a medium through which light incidents to the respective one of the plurality of grating blocks 1030, $\theta_i$ is a divergence angle between a light beam irradiating at a center of the respective one of the plurality of grating blocks 1030 and a Z-axis direction; $\varphi_i$ is an angle between an orthographic projection of light beam irradiating the center of the respective one of the plurality of grating blocks 1030 on a X-Y plane and an X-axis direction; m represents a diffracted order, λ represents a wavelength range of the light incident on the respective one of the plurality of grating blocks 1030, $\theta_d$ represents an angle between light diffracted by the respective one of the plurality of grating blocks 1030 and the Z-axis, $\varphi_d$ represents an angle between an orthographic projection of the light diffracted by the respective one of the plurality of grating blocks 1030 on the X-Y plane and the Z-axis, $n_d$ represents a refractive index of a medium through which light transmits after the light is diffracted by the respective one of the plurality of grating blocks 1030.

In some embodiments, the respective one of the plurality of grating blocks 1030 is configured to diffract light of a selected wavelength range to obtain a first order of diffracted light having the selected wavelength range. Light having wavelength ranges other than the selected wavelength range is transmitted through the respective one of the plurality of grating blocks 1030, absorbed by the respective one of the plurality of grating blocks 1030, or reflected by the respective one of the plurality of grating blocks 1030. Optionally, the respective one of the plurality of grating blocks is a volume Bragg grating. Optionally, in order to have the first order of diffracted light, m in the equation (1) should be 1.

Optionally, at least two grating blocks of a same wavelength selectivity are directly adjacent to each other, and form a grating group of the same wavelength selectivity for diffracting light of a same color. Optionally, the light of same color diffracted by the grating group of the same wavelength selectivity is transmitted to a same region of the first side of the first substrate corresponding to the respective one of the plurality of extractors. Optionally, the respective one of the plurality of extractors may extract the light of same color diffracted by the grating group of the same wavelength selectivity.

Figure 3E:
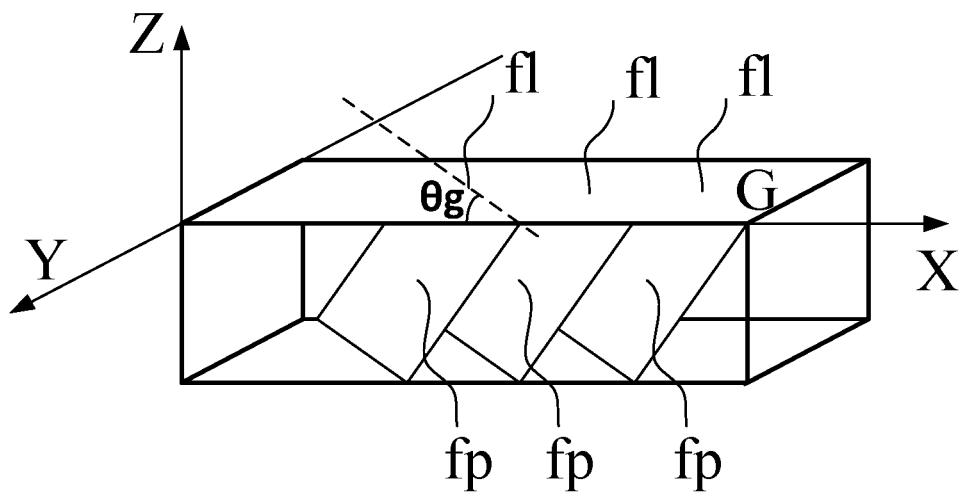
FIG. 3E is a schematic diagram of an arrangement of a respective one of a plurality of grating blocks of different wavelength selectivity on a radiation region of a unitary grating plate irradiated by a converged light emitted from a light source in some embodiments according to the present disclosure.

FIG. 3E is a schematic diagram of an arrangement of a respective one of a plurality of grating blocks of different wavelength selectivity on a radiation region of a unitary grating plate irradiated by a converged light emitted from a light source in some embodiments according to the present disclosure. Referring to FIG. 3C, FIG. 3D and FIG. 3E, in some embodiments, a coordinate of a center of a grating block G of the plurality of grating blocks 1030 of the unitary grating plate 103 is (608 µm, 203 µm). The incident angle ($\theta_i$, $\varphi_i$) of light irradiating at the center of the grating block G is (18°, 42°). A respective one of the plurality of grating blocks 1030 includes a plurality of fringes fp, each of which has a fringe line fl. Optionally, the grating block G is configured to only diffract light having a wavelength of 580 nm (e.g. a green light), and the direction ($\theta_d$, $\varphi_d$) of light diffracted by the grating block G is designed as (60°, 0). Based on equations (2) to (5), the period A of the grating block G is 570 nm. An arrangement direction of fringes of a respective one of the plurality of grating blocks 1030 may be expressed as an angle $\theta_g$ between the X-axis and a direction of a fringe line of the respective one of the plurality of grating blocks 1030. The angle $\theta_g$ may be calculated using Equation (5). The angle $\theta_g$ between the X-axis and the direction of a fringe line of the grating block G is 72°.

Optionally, the direction ($\theta_d$, $\varphi_d$) of light diffracted by the respective one of the plurality of grating blocks 1030 is determined by the coordinate of the center of the respective one of the plurality of grating blocks 1030 and the location of the microfluidic channel where the diffracted light will reach. Optionally, subsequent to obtaining the direction ($\theta_d$, $\varphi_d$) of light, the direction ($\theta_d$, $\varphi_d$) of light diffracted by the respective one of the plurality of grating blocks 1030 can be used to determine the period A of the respective one of the plurality of grating blocks 1030, and the angle $\theta_g$ an angle between the X-axis and the direction of a fringe line of the respective one of the plurality of grating blocks 1030.

In some embodiments, the respective one of the plurality of extractors is a transmissive grating. The diffraction principle of the plurality of grating blocks 1030 is the same as the principle of the plurality of light extractors. In one example, the incident angle of light diffracted by the respective one of the plurality of grating blocks toward the respective one of the plurality of extractors can be determined by the direction of light diffracted by the respective one of the plurality of grating blocks. Based on the incident angle of light diffracted by the respective one of the plurality of grating blocks toward the respective one of the plurality of extractors, the period A of the respective one of the plurality of extractors and the angle $\theta_g$ between the X-axis and the direction of a fringe line of the respective one of the plurality of contractors can be determined.

Figure 4:
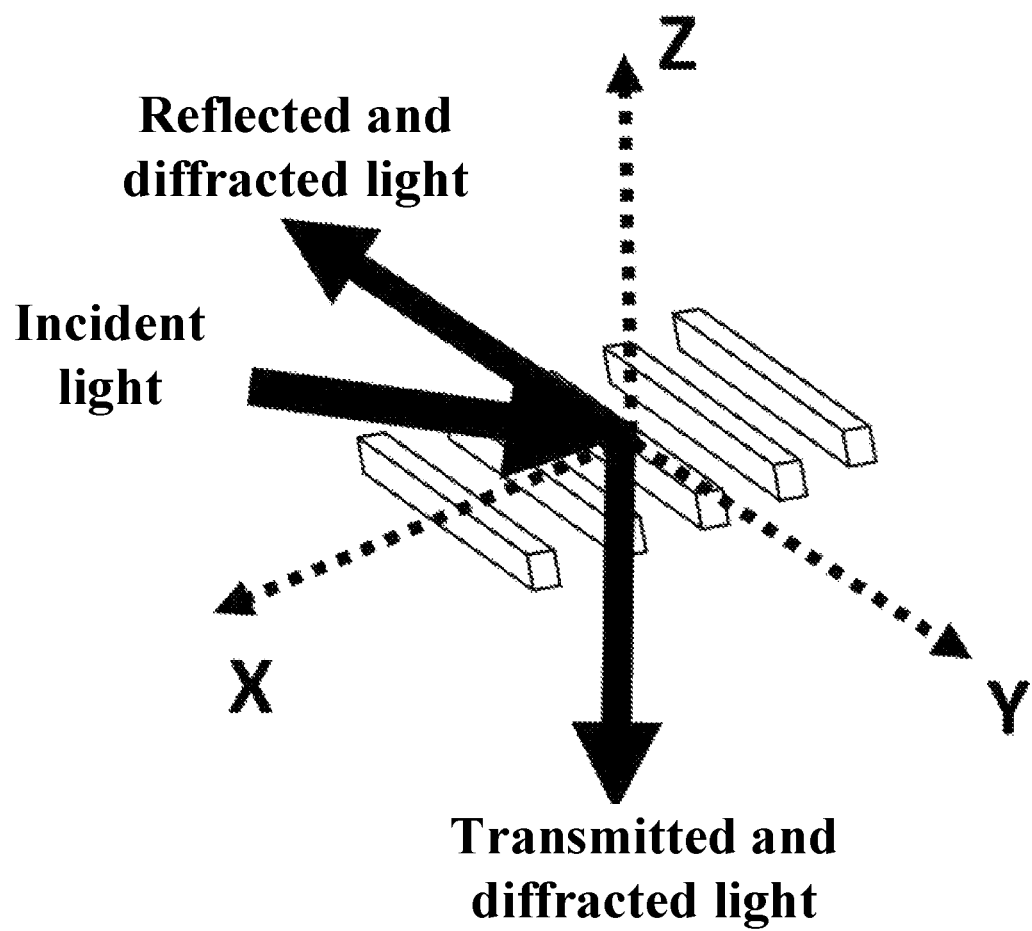
FIG. 4 is a schematic diagram illustrate relationships between a respective one of a plurality of light extractors, a direction of light diffracted and transmitted by the respective one of the plurality of light extractors, and a direction of light diffracted and reflected by the respective one of the plurality of light extractors in some embodiments according to the present disclosure.

FIG. 4 is a schematic diagram illustrate relationships between a respective one of a plurality of light extractors, a direction of light diffracted and transmitted by the respective one of the plurality of light extractors, and a direction of light diffracted and reflected by the respective one of the plurality of light extractors in some embodiments according to the present disclosure. Referring to FIG. 4, in some embodiments, the respective one of the plurality of extractors is configured to extract collimated light perpendicular to a plane containing the respective one of the plurality of extractors. So, the angle $\theta_d$ between light diffracted by the respective one of the plurality of extractors and the Z-axis is 180. Based on the equation (2), a period $\Lambda_x$ along the X-axis of the respective one of the plurality of extractors is calculated using a following equation (6):

$$\Lambda_x = \frac{m\lambda}{n_i(\sin\theta_i \cos\varphi_i)}; \quad (6)$$

A period $\Lambda_y$ along the Y-axis of the respective one of the plurality of extractors is calculated using a following equation (7):

$$\Lambda_y = \frac{m\lambda}{n_i(\sin\theta_i \sin\varphi_i)}; \quad (7)$$

A period $\Lambda$ of the respective one of the plurality of extractors is calculated using an equation (4):

$$\Lambda = +\sqrt{\Lambda_x^2 + \Lambda_y^2} \quad (4);$$

An arrangement direction of fringes of a respective one of the plurality of grating blocks 1030 may be expressed as an angle $\theta_g$ between the X-axis and the direction of a fringe line of the respective one of the plurality of extractors, and calculated using an equation (5):

$$\theta_g = \arctan(\Lambda_y/\Lambda_x) \quad (5);$$

wherein $\Lambda$ represents the period of the respective one of the plurality of extractors, $\Lambda_x$ represents the period along the X-axis of the respective one of the plurality of extractors, $\Lambda_y$ represents the period along the Y-axis of the respective one of the plurality of extractors, $\theta_g$ an angle between the X-axis and the direction of a fringe line of the respective one of the plurality of extractors, $n_i$ represents a refractive index of a medium through which light incidents to the respective one of the plurality of extractors, $\theta_i$ represents an angle between light incident on the respective one of the plurality of extractors and the Z-axis, $\varphi_i$ represents an angle between an orthographic projection of the light incident on the respective one of the plurality of extractors on the X-Y plane and the Z-axis, m represents a diffracted order, $\lambda$ represents a wavelength range of the light incident on the respective one of the plurality of extractors.

For example, referring to FIG. 2 and FIG. 4, the light diffracted by the grating blocks G is extracted by the respective one of the plurality of light extractors 1040. The light transmitted through the respective one of the plurality of light extractors 1040 is light having a wavelength of 580 nm (e.g. the green light). The period A of the respective one of the plurality of extractors 1040 is 441 nm. The angle $\theta_g$ between the X-axis and the direction of a fringe line of the respective one of the plurality of extractors is 180°.

Figure 5:
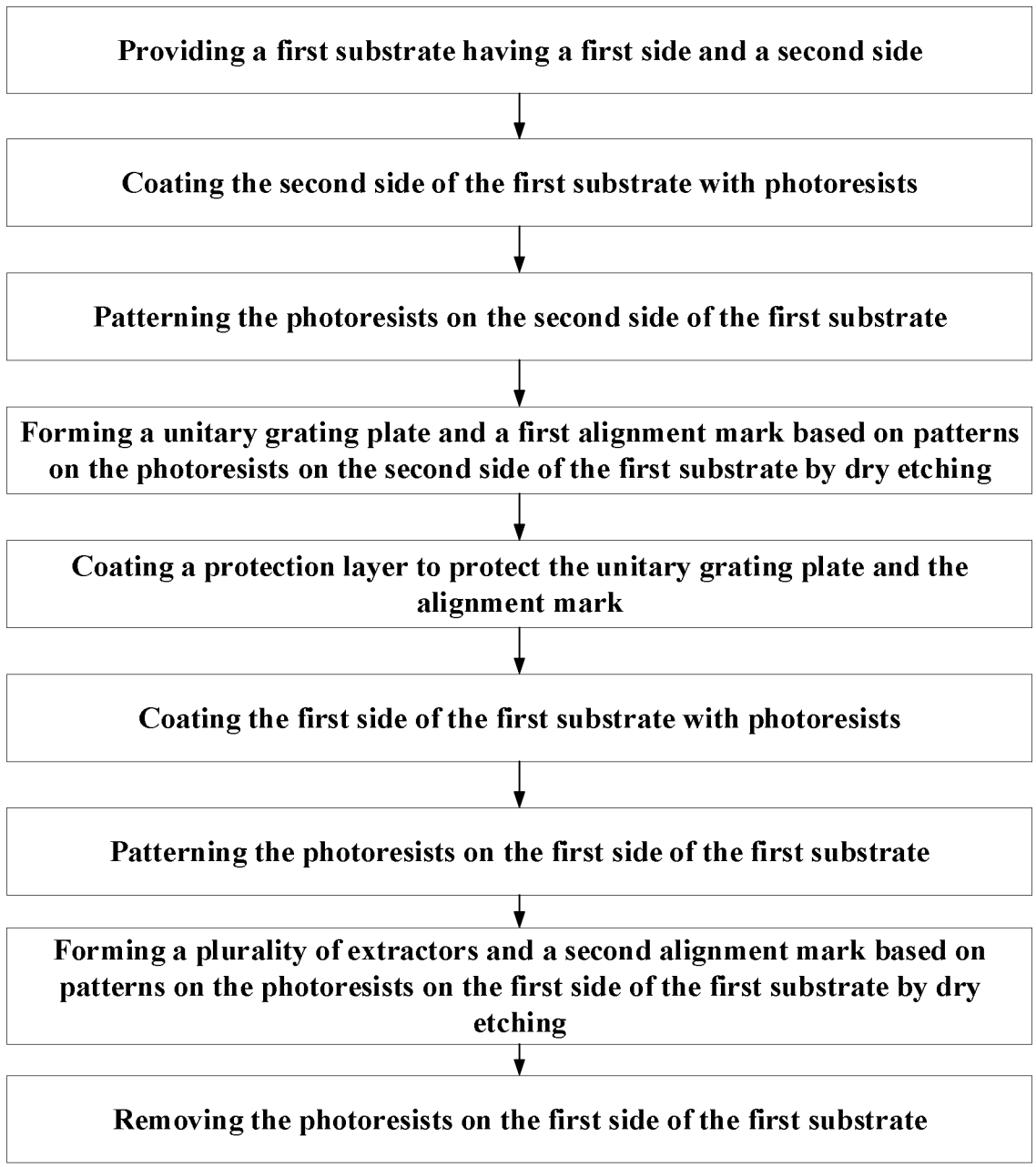
FIG. 5 is a flow chat illustrating a method of fabricating a spectrometer in some embodiments according to the present disclosure.

In another aspect, the present disclosure also provides a method of fabricating a spectrometer. FIG. 5 is a flow chat illustrating a method of fabricating a spectrometer in some embodiments according to the present disclosure. Referring to FIG. 5, in some embodiments, the method of fabricating the spectrometer includes providing a first substrate having a first side and a second side; coating the second side of the first substrate with photoresists; patterning the photoresists on the second side of the first substrate; forming a unitary grating plate and a first alignment mark based on patterns on the photoresists on the second side of the first substrate by dry etching; coating a protection layer to protect the unitary grating plate and the alignment mark; coating the first side of the first substrate with photoresists; patterning the photoresists on the first side of the first substrate; forming a plurality of light extractors of a light extractor layer and a second alignment mark based on patterns on the photoresists on the first side of the first substrate by dry etching; and removing the photoresists on the first side of the first substrate.

Optionally, Electron beam direct writing (EBL) or nanoimprint (NIP) can be used to pattern the photoresists on the second side of the first substrate and the photoresists on the first side of the first substrate.

Optionally, methods of dry etching include, but are not limited to, inductively coupled plasma etching (ICP) and reactive ion etching.

Figure 6A:
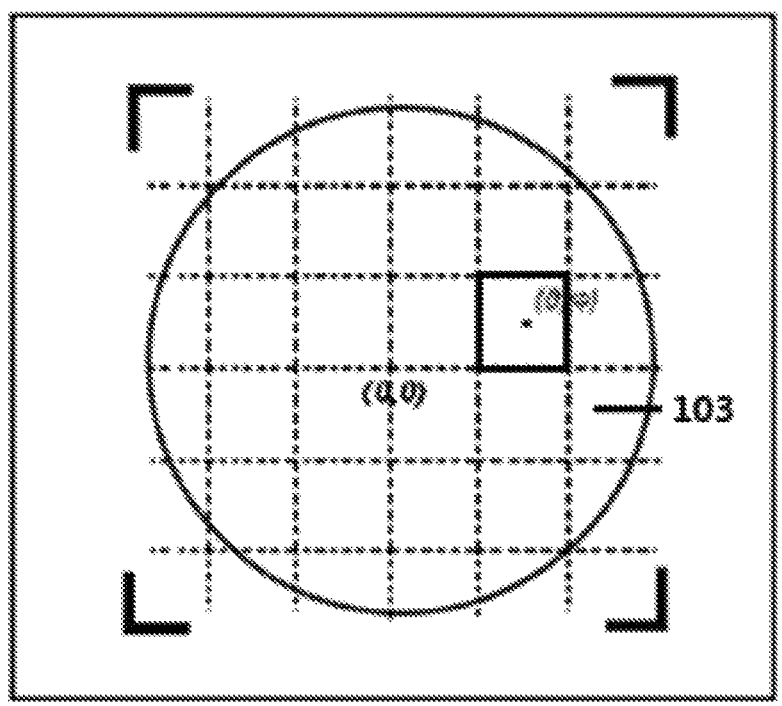
FIG. 6A is a schematic diagram of an arrangement of a plurality of grating blocks of different wavelength selectivity on a second side of a first substrate, and a first alignment mark of the plurality of grating blocks in some embodiment according to the present disclosure.

FIG. 6A is a schematic diagram of an arrangement of a plurality of grating blocks of different wavelength selectivity on a second side of a first substrate, and a first alignment mark of the plurality of grating blocks in some embodiment according to the present disclosure. FIG. 6A shows the unitary grating plate 103 and the first alignment mark formed by dry etching on the photoresists on second side of the first substrate.

Figure 6B:
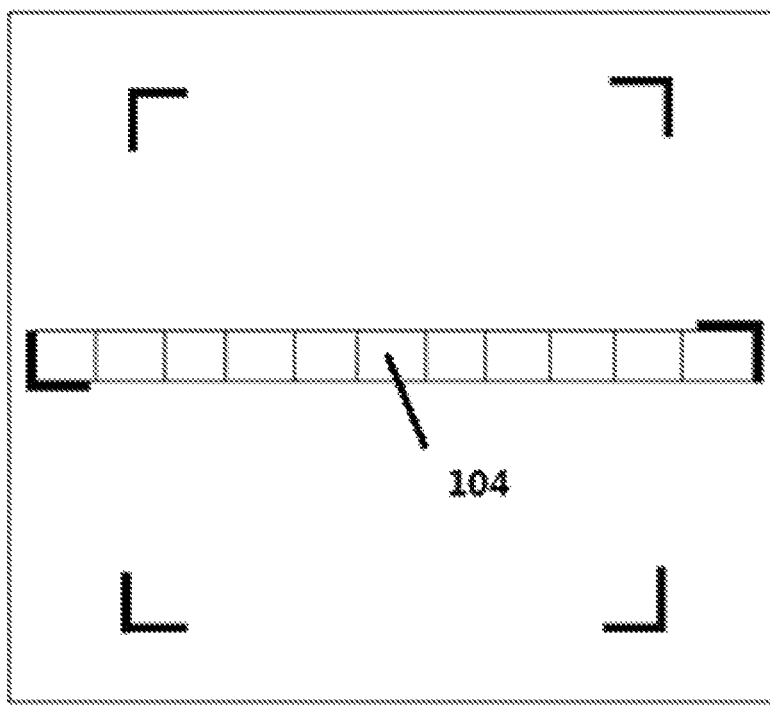
FIG. 6B is a schematic diagram of an arrangement of a plurality of light extractors on a first side of a first substrate, and a second alignment mark of the plurality of light extractors in some embodiment according to the present disclosure.

FIG. 6B is a schematic diagram of an arrangement of a plurality of light extractors on a first side of a first substrate, and a second alignment mark of the plurality of light extractors in some embodiment according to the present disclosure. FIG. 6B shows the plurality of extractors of the light extraction layer 104 and the second alignment mark formed by dry etching on the photoresists on the first side of the first substrate by dry etching.

Optionally, removing the photoresists on the first side of the first substrate includes cleaning the photoresists on the first side of the first substrate, and drying the first side of the first substrate. Optionally, removing the photoresists from the spectrometer includes subsequently cleaning the spectrometer using acetone, alcohol and deionized water, and cleaning the spectrometer using ultrasonic cleaning machine. Optionally, a time period for cleaning is determined by a thickness of the photoresists. Subsequent to removing the photoresists from the spectrometer, the spectrometer is dried with nitrogen gas.

In one aspect, the present disclosure provides a method of fabricating the microfluidic apparatus includes forming a spectrometer described herein; providing a second substrate; and assembling first substrate and second substrate to form a cell.

Optionally, the method of fabricating the microfluidic apparatus further includes forming a microfluidic layer on a side of the second substrate closer to the first substrate.

In one aspect, the present disclosure also provides a method of detecting a substance in a microfluidic apparatus. In some embodiments, the method of detecting the substance in the microfluidic apparatus includes providing a light source on a first side of a first substrate; providing a unitary grating plate on a second side of the first substrate. Optionally, the unitary grating plate includes a plurality of grating blocks of different wavelength selectivity. Optionally, the unitary grating plate is configured to diffract light emitted from the light source transmitted through the first substrate. Optionally, the first side and the second side are opposite to each other.

Optionally, the method of detecting the substance in the microfluidic apparatus includes providing a light extraction layer including a plurality of light extractors on the first side of the first substrate; respectively diffracting light of different colors into different light extractors of the plurality of light extractors using grating blocks of different wavelength selectivity; extracting light of a same color diffracted by grating blocks of a same wavelength selectivity into extracted light of a same color using a respective one of the plurality of light extractors; providing a microfluidic layer on the first substrate and defining a microfluidic channel on a side of the first side away from the second side; providing a plurality of detectors on a side of the microfluidic channel away from the first substrate; detecting the extracted light of a same color transmitted through the microfluidic channel using a respective one of the plurality of detectors; respectively detecting extracted light of different colors respectively from different light extractors of the plurality of light extractors using different detectors of the plurality of detectors.

In some embodiments, the plurality of detectors include a first detector and a second detector. The plurality of grating blocks of different wavelength selectivity include a plurality of first grating blocks of a first wavelength selectivity and a plurality of second grating blocks of a second wavelength selectivity. The plurality of light extractors includes a first light extractor and a second light extractor.

Optionally, the method of detecting the substance in the microfluidic apparatus includes extracting light of a first color diffracted by the plurality of first grating blocks of the first wavelength selectivity into extracted light of the first color using the first light extractor; extracting light of a second color diffracted by the plurality of second grating blocks of the second wavelength selectivity into extracted light of the second color using the second light extractor; detecting at least portion of the extracted light of the first color transmitted through the microfluidic channel using the first detector; and detecting at least portion of the extracted light of the second color transmitted through the microfluidic channel using the second detector.

In some embodiments, the plurality of detectors include a first detector, a second detector, and a third detector. The plurality of grating blocks of different wavelength selectivity include a plurality of first grating blocks of a first wavelength selectivity, a plurality of second grating blocks of a second wavelength selectivity, and a plurality of third grating blocks of a third wavelength selectivity. The plurality of light extractors include a first light extractor, a second light extractor, and a third light extractor.

Optionally, the method of detecting the substance in the microfluidic apparatus includes extracting light of a first color diffracted by the plurality of first grating blocks of the first wavelength selectivity into extracted light of the first color using the first light extractor; extracting light of a second color diffracted by the plurality of second grating blocks of the second wavelength selectivity into extracted light of the second color using the second light extractor; extracting light of a third color diffracted by the plurality of third grating blocks of the third wavelength selectivity into extracted light of the third color using the third light extractor; detecting at least portion of the extracted light of the first color transmitted through the microfluidic channel using the first detector; detecting at least portion of the extracted light of the second color transmitted through the microfluidic channel using the second detector; and detecting at least portion of the extracted light of the third color transmitted through the microfluidic channel using the third detector.

In some embodiments, the light source includes a light emitting element and a light converging element. Optionally, the method of detecting the substance in the microfluidic apparatus further includes converging light emitted from the light emitting element into a converged light having a divergence angle between an outmost light beam of the converged light and a normal direction to the first surface, the divergence angle being equal to or less than 30°.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A microfluidic apparatus, comprising:
   a first substrate;
   a microfluidic layer on the first substrate and defining a microfluidic channel, wherein the first substrate having a first side closer to the microfluidic layer, and a second side away from the microfluidic layer, the first side and the second side opposite each other;
   a plurality of detectors on a side of the microfluidic channel away from the first substrate;
   a unitary grating plate on the second side of the first substrate and comprising a plurality of grating blocks; and
   a light extraction layer comprising a plurality of light extractors on the first side of the first substrate and configured to extract light diffracted by the plurality of grating blocks out of the first substrate;
   wherein a respective one of the plurality of light extractors is optically coupled to grating blocks of a same wavelength selectivity of the plurality of grating blocks, and configured to extract light of a same color diffracted by the grating blocks of the same wavelength selectivity into extracted light of a same color;
   grating blocks of different wavelength selectivity of the plurality of grating blocks are configured to respectively diffract light of different colors into different light extractors of the plurality of light extractors;
   a respective one of the plurality of detectors is configured to detect the extracted light of a same color transmitted through the microfluidic channel; and
   different detectors of the plurality of detectors are configured to respectively detect extracted light of different colors respectively from different light extractors of the plurality of light extractors;
   wherein the plurality of detectors comprise a first detector, a second detector, and a third detector;
   the grating blocks of different wavelength selectivity comprise a plurality of first grating blocks of a first wavelength selectivity, a plurality of second grating blocks of a second wavelength selectivity, and a plurality of third grating blocks of a third wavelength selectivity; and
   the plurality of light extractors comprise a first light extractor, a second light extractor, and a third light extractor;
   wherein the first light extractor is optically coupled to the plurality of first grating blocks of the first wavelength selectivity, and configured to extract light of a first color diffracted by the plurality of first grating blocks of the first wavelength selectivity into extracted light of the first color;
   the second light extractor is optically coupled to the plurality of second grating blocks of the second wavelength selectivity, and configured to extract light of a second color diffracted by the plurality of second grating blocks of the second wavelength selectivity into extracted light of the second color;
   the third light extractor is optically coupled to the plurality of third grating blocks of the third wavelength selectivity, and configured to extract light of a third color diffracted by the plurality of third grating blocks of the third wavelength selectivity into extracted light of the third color;
   the first detector is configured to detect at least portion of the extracted light of the first color transmitted through the microfluidic channel;
   the second detector is configured to detect at least portion of the extracted light of the second color transmitted through the microfluidic channel; and
   the third detector is configured to detect at least portion of the extracted light of the third color transmitted through the microfluidic channel.

2. The microfluidic apparatus of claim 1, wherein the respective one of the plurality of light extractors is configured to collimate light of a same color diffracted by the grating blocks of the same wavelength selectivity into substantially collimated light of a same color;
   the respective one of the plurality of detectors is configured to detect the substantially collimated light of a same color transmitted through the microfluidic channel; and
   different detectors of the plurality of detectors are configured to respectively detect substantially collimated light of different colors respectively from different light extractors of the plurality of light extractors.

3. The microfluidic apparatus of claim 1, wherein the respective one of the plurality of light extractors is configured to converge light of a same color diffracted by the grating blocks of the same wavelength selectivity into focused light converging on a converging point;
   the respective one of the plurality of detectors is configured to detect the focused light of a same color transmitted through the microfluidic channel, the converging point being on the respective one of the plurality of detectors; and
   different detectors of the plurality of detectors are configured to respectively detect focused light of different colors respectively from different light extractors of the plurality of light extractors.

4. The microfluidic apparatus of claim 1, further comprising a light source on the first side of the first substrate;
wherein the unitary grating plate is configured to diffract light emitted from the light source transmitted through the first substrate; and
the light source comprises a light emitting element and a light converging element configured to converge light emitted from the light emitting element into a converged light having a divergence angle between an outmost light beam of the converged light and a normal direction to the first side, the divergence angle being equal to or less than 30°.

5. The microfluidic apparatus of claim 4, wherein the light converging element comprises a converging reflective mirror having a reflective surface on a side of the light emitting element away from the unitary grating plate, and configured to reflect light from the light emitting element to form the converged light.

6. The microfluidic apparatus of claim 4, wherein the light converging element comprises a converging lens.

7. The microfluidic apparatus of claim 1, wherein a respective one of the plurality of grating blocks is a volume Bragg grating.

8. The microfluidic apparatus of claim 1, wherein at least two grating blocks of a same wavelength selectivity of the plurality of grating blocks are directly adjacent to each other, and form a grating group of the same wavelength selectivity for diffracting light of a same color.

9. The microfluidic apparatus of claim 1, wherein the plurality of grating blocks are directly adjacent to each other.

10. A method of detecting a substance in a microfluidic apparatus, comprising:
providing a light source on a first side of a first substrate;
providing a unitary grating plate on a second side of the first substrate, wherein the unitary grating plate comprises a plurality of grating blocks, and the unitary grating plate is configured to diffract light emitted from the light source transmitted through the first substrate, the first side and the second side are opposite to each other;
providing a light extraction layer comprising a plurality of light extractors on the first side of the first substrate;
respectively diffracting light of different colors into different light extractors of the plurality of light extractors using grating blocks of different wavelength selectivity of the plurality of grating blocks;
extracting light of a same color diffracted by grating blocks of a same wavelength selectivity of the plurality of grating blocks into extracted light of a same color using a respective one of the plurality of light extractors;
providing a microfluidic layer on the first substrate and defining a microfluidic channel on a side of the first side away from the second side;
providing a plurality of detectors on a side of the microfluidic channel away from the first substrate;
detecting the extracted light of a same color transmitted through the microfluidic channel using a respective one of the plurality of detectors;
respectively detecting extracted light of different colors respectively from different light extractors of the plurality of light extractors using different detectors of the plurality of detectors;
wherein the plurality of detectors comprise a first detector, a second detector, and a third detector;
the grating blocks of different wavelength selectivity comprise a plurality of first grating blocks of a first wavelength selectivity, a plurality of second grating blocks of a second wavelength selectivity, and a plurality of third grating blocks of a third wavelength selectivity; and
the plurality of light extractors comprise a first light extractor, a second light extractor, and a third light extractor;
the method further comprises:
extracting light of a first color diffracted by the plurality of first grating blocks of the first wavelength selectivity into extracted light of the first color using the first light extractor;
extracting light of a second color diffracted by the plurality of second grating blocks of the second wavelength selectivity into extracted light of the second color using the second light extractor;
extracting light of a third color diffracted by the plurality of third grating blocks of the third wavelength selectivity into extracted light of the third color using the third light extractor;
detecting at least portion of the extracted light of the first color transmitted through the microfluidic channel using the first detector;
detecting at least portion of the extracted light of the second color transmitted through the microfluidic channel using the second detector; and
detecting at least portion of the extracted light of the third color transmitted through the microfluidic channel using the third detector.

11. The method of claim 10, wherein the light source comprises a light emitting element and a light converging element; the method further comprises converging light emitted from the light emitting element into a converged light having a divergence angle between an outmost light beam of the converged light and a normal direction to the first side, the divergence angle being equal to or less than 30°.

* * * * *